United States Patent Office 3,213,038
Patented Oct. 19, 1965

3,213,038
HYDROCARBON CRACKING CATALYST OBTAINED BY ACID TREATING KAOLIN AND ADDING MAGNESIA
Nicholas Chomitz, Yonkers, N.Y., assignor to American Cyanamid Company, Stamford, Conn., a corporation of Maine
No Drawing. Filed Aug. 1, 1963, Ser. No. 299,159
6 Claims. (Cl. 252—450)

The present invention relates to an improved synthetic catalyst for the cracking of petroleum hydrocarbon feed stocks and more particularly to an improved silica magnesia cracking catalyst, to the process for preparing the same and to its use in the cracking of petroleum feed stocks.

Silica magnesia catalysts have long been known for use in the conversion of hydrocarbon oils and are known to possess certain advantages in such cracking operations, principal among them being the production of larger portions of gasoline in relation to the production of fixed gases as, for example, the $C_1$ to $C_4$ gases, and of carbon.

The production of larger yields of gasoline referred to above is in relation to yields achieved by commercially available synthetic silica alumina catalyst under similar operating conditions. Such a commercially available synthetic silica alumina cracking catalyst may, for example, contain about 12% alumina and the balance essentially silica, based on the total weight of the catalyst. In general, it might be said that synthetic silica magnesia catalyst yield about 15–20% more gasoline than silica alumina catalyst under the same cracking conditions.

While this known improvement in gasoline yield is primarily the basis for the acceptability of silica magnesia catalysts, such catalysts are characterized by certain shortcomings such as lack of stability on steam treatment. Any improvement in synthetic silica magnesia catalysts which would improve their stability on steaming would greatly improve their commercial acceptance.

Known prior art methods for the preparation of a silica magnesia or silica alumina magnesia catalyst generally involves reacting magnesia with a synthetic silica or synthetic silica alumina base. These base materials ordinarily have average pore diameters between 30 to 100 A. The resultant catalysts are usually not thermally stable and sinter on usage.

Accordingly, it is an object of the present invention to provide an improved silica magnesia or silica alumina magnesia cracking catalyst which, when employed in the cracking of petroleum hydrocarbon feed stocks, results in substantially improved yields in gasoline fraction.

It is a further object of the present invention to provide an improved silicia magnesia or silica alumina magnesia cracking catalyst which is thermally and hydrothermally stable.

It is a further object of the present invention to provide a simple and low cost method of preparing such catalyst and one which is readily adaptable to conventional plant equipment.

It is still a further object of the present invention to provide a process for the cracking of high boiling petroleum hydrocarbons employing the catalyst of the present invention.

These and other objects and advantages of the present invention will become apparent from the detailed description thereof set forth hereinbelow.

It has now been discovered that an improved silica magnesia or silica alumina magnesia cracking catalyst may be obtained employing a kaolin residue having certain characteristics, defined hereinafter, as the base. In addition to being a low cost base material, such a kaolin residue imparts exceptional stability on exposure to high temperatures to the catalysts made therefrom.

It is well known, of course, that hydrocarbon conversion catalysts may be derived from various clays. Of particular interest have been those types of clays known as montmorillonite, bentonite and bauxite. On the other hand, kaolin clays, although commercially available, have not achieved as wide acceptance as the montmorillonite, bentonite and bauxite clays principally because of diminished catalytic activity. In order to improve the catalytic activity of kaolin clays and other comparatively inert and inactive silicates of alumina, acid treatment or acid leaching of the same has been resorted to. Since the general formula for kaolin clays is $Al_2O_3 \cdot 2H_2O:2SiO_2$, it is noted that kaolin clays can offer a readily available source of base material whose principal components are silica and alumina. At least four distinct types of kaolin are identified as, for example, kaolinite, dickite, nakrite and anauxite. As the term is employed herein, "kaolin" is intended to embrace any of these four types and mixtures thereof and all of which may sometimes be found admixed with certain small percentages of montmorillonite. In addition to the silica alumina components, kaolin clays may also contain minor amounts of iron, calcium, magnesium or alkali metals. Depending upon the source of the kaolin, the amounts of silica and alumina within the kaolin are noted to vary.

It has now been discovered that a silica magnesia catalyst or a silica alumina magnesia catalyst may be prepared by utilizing as the base material a naturally occurring kaolin residue resulting from acid digestion thereof. Such catalysts are surprisingly thermally stable. Because the kaolin is employed to furnish the silica or silica alumina content in the silica magnesia or silica alumina magnesia catalyst of this invention, it will be readily seen that the catalysts so prepared are markedly less costly to manufacture than a silica magnesia or silica alumina magnesia catalyst obtained from prepared hydrated silica gel or hydrated silica alumina gel. In addition, kaolin residues utilized in accordance with this invention offer additional advantages because of their comparatively high densities and high temperatures of incipient fusion.

In accordance with the present invention, it has been unexpectedly found that a thermally stable silica magnesia or silica alumina magnesia catalyst may be prepared by carrying out the following steps. A naturally occurring kaolin is digested with an inorganic acid so as to remove from about 85 to about 100% of the $Al_2O_3$ content. Following the digestion step, the digestion mass is allowed to settle. The supernatant liquid containing metallic salts which have been removed during the acid digestion step is separated usually by decanting, filtering or centrifuging. The residue resulting from acid digestion now contains from about 85 to 100% silica and from 15 to 0% $Al_2O_3$. This residue which may be spray dried is then reacted thermally or hydrothermally with magnesia, preferably having a surface area of about 10 to about 30 m.²/g., for a minimum of two hours at a minimum temperature of about 50° C. The reaction product containing about 65 to about 85% kaolin residue and about 15 to about 35% magnesia is spray or flash dried to yield a catalytically active "fluid" type material suitable for hydrocarbon cracking.

It will thus be seen that the process essentially involves acid leaching or digesting a kaolin clay in order to remove most of the alumina and other acid soluble constituents and subsequently reacting the digested clay residue with magnesia whereby magnesia is incorporated within the treated clay. An improved silica magnesia or silica alumina magnesia catalyst is thereby obtained.

The theoretical explanation underlying the obtaining of a silica magnesia or silica alumina magnesia catalyst such as that obtained herein which possesses superior activity after steaming is not completely understood. However, it is believed that because of acid leaching or digesting, the kaolin base is converted to an active form. Moreover, upon acid activation with concomitant removal of a substantial portion of the alumina and acid soluble impurities, a base material having an average pore diameter from 200 to 400 A. which is readily more resistant to decrease in pore diameter upon thermal or hydrothermal treatment is obtained. This kaolin residue which may have some catalytic activity itself in hydrocarbon conversion processes serves as a carrier for the magnesia which is deposited on the residue during one of the subsequent steps of the process.

The catalysts obtained by the process of this invention may be employed in the form of a finely divided powder or microspheres in fluid bed processes or the catalyst may be later easily formed into larger aggregates such as pills, pellets, granules and the like suitable for use generally in fixed bed or moving bed processes.

The extent of acid threatment of the kaolin clay is generaly governed by such factors as concentration, time, and temperature and the $Al_2O_3$ content of the kaolin clay being treated. However, such acid treatment must be sufficient to extract from about at least 85 to about 100% of $Al_2O_3$ from kaolin. While removal of less than about 85% of the $Al_2O_3$ content is not precluded, it has been found that catalysts of extremely high activity after steaming are obtained when about 85 to about 100% of the original $Al_2O_3$ content is removed and magnesia is subsequently reacted with the kaolin residue.

It will be readily understood that depending upon the kind of acid used, the dilution of acid, the ratio of acid to clay and the temperature of treatment, the rate at which the $Al_2O_3$ is extracted will vary widely. The acid treatment may be effected by adding an inorganic acid such as hydrochloric acid, nitric acid or sulfuric acid, and preferably the latter, of moderate to strong concentration to an aqueous slurry of kaolin clay or by adding the slurry to the acid. Alternatively, dilute acid may be added directly to the raw or dry clay. The weight ratio of acid to dry clay may be from 20 to about 100% although higher ratios may also be employed. Ratios in the range of about 60 to about 100% are preferred. Treatment of kaolin clay with acid is preferably carried out at elevated temperatures at from about 150° F. to about the boiling point of the acid-clay mixture. The clay may be permitted to soak in the acid or any known leaching or digesting procedure may be employed. Following the acid treatment step, the clay residue after separation from the filtrate may be washed with water in order to remove soluble aluminum and other metallic salts, e.g., calcium, magnesium, and iron salts. In some instances, the washing step may be eliminated.

Although the residue may then be reacted directly with magnesia it is generally preferred to dry the residue before such reaction. The residue is ordinarily rapidly dried by spray drying or flash drying or any other suitable drying technique. Spray drying is preferred in that large amounts of material may be processed in relatively short periods of time. Any suitable spray drier may be used. One that has been employed with good results is described in United States Patent No. 2,644,516, dated July 7, 1953. Although gas inlet temperatures of up to 1300° F. have been employed successfully, the temperature of the drying gases entering the spray drying chamber is preferably controlled within the range of about 500 to 1000° F. so that the kaolin residue will be converted to microspheres during the drying procedure. The spray dried microspheres are then reacted hydrothermally with magnesia having a surface area of about 10 to 30 m.²/g. for a minimum of two hours at a minimum temperature of 35° C. The residue containing magnesia is then flash or oven dried and subsequently calcined to form the finished catalyst.

In order to illustrate the present invention, the following non-limiting examples are given.

EXAMPLE 1

Eight thousand and seventy-five parts of 48.5° Baumé slip of Andersonville kaolin clay (46.4% ignited solids) at 105° F. are added to 7400 parts of 98% sulfuric acid at 160° F. in a suitable digestor equipped with agitator. A maximum temperature of 280° F. is reached after twenty minutes while temperatures of 240° F. and 225° F. after one and two hours, respectively, are subsequently noted. After a total 2.5 hours acid digestion period, dilution water and flocculating agent are added to the digestor. The batch is then pumped to a settling tank and after six hours, the alum extract solution is pumped from the tank leaving the clay residue. Approximately 85% of the original alumina content of about 45% is removed from the kaolin clay by this procedure.

A 40% water slurry of the clay residue is then led to a spray drier having inlet temperatures of 650° F. Microspheres having an average pore diameter of 280 A. are obtained.

EXAMPLE 2

Two hundred and seventy parts of the microspheres obtained in Example 1 are slurried with 830 parts of water and 95 parts of magnesia having a surface area of 30 m.²/g. are added. The temperature of the reaction mixture is maintained at 50° C. After a reaction time of three hours, the magnesia-containing kaolin residue slurry is placed in a drying oven at 250° F. for 16 hours. At the end of this drying period the catalyst product is collected and calcined at 1100° F. for one hour. The catalyst contained about 28% of magnesia, about 5% of alumina and about 67% of silica.

EXAMPLE 3

Fifteen parts of 41° Baumé sodium silicate containing 8.5% $Na_2O$ and 28.5% $SiO_2$ is added to 61 parts of water. Eight and one-half parts of 25% sulfuric acid are added with vigorous agitation over a twenty minute period to cause gelation. The gel is spray dried and washed free of contaminating ions with water. Microspheres having an average pore diameter of 50 A. are obtained.

EXAMPLE 4

The procedure of Example 2 is repeated in all essential respects using the synthetic silica microspheres obtained in Example 3. The resultant catalyst contained about 28% of magnesia and about 72% of silica.

The catalyst of Example 2 is tested for change of surface properties and activity on steaming and is compared with the catalyst of Example 4. Surface properties and activity are determined in accordance with the procedures described in the "Cyanamid Manual of Test Methods for Synthetic Fluid Cracking Catalyst" prepared by the Refinery Chemicals Department of American Cyanamid Company, copyright 1957.

The results of this comparison are set forth in the accompanying table.

Table

|  | Catalyst of— | |
| --- | --- | --- |
|  | Example 2 | Example 4 |
| Surface Area, fresh (m.²/g.) | 364 | 495 |
| Surface Area, steamed (m.²/g.) | 228 | 214 |
| Pore Volume, fresh (cc./g.) | .48 |  |
| Pore Volume, steamed (cc./g.) | .45 |  |
| Activity, fresh | 52 | 75 |
| Activity, steamed | 41 | 24 |

From an examination of the results appearing in the table hereinabove, it will be seen that the catalyst of Example 2 has lost only 37% of its surface area on steaming while the catalyst of Example 4 has lost 57% of its surface area on steaming. Moreover, it will be noted that the catalyst of Example 2, after steaming, retains about 79% of its fresh activity while the catalyst of Example 4, after steaming, retains only about 32% of its fresh activity. The small reduction in pore volume of the catalyst of Example 2 on steaming is also significant and demonstrates the marked steam stability of a typical catalyst prepared by the process of this invention.

While this invention has been described in conjunction with various preferred embodiments, it is to be understood that the invention is not to be solely limited thereto but is to be construed broadly and restricted only by the appended claims.

I claim:

1. A process for preparing a magnesia containing silica catalyst which comprises digesting kaolin with acid so as to remove therefrom at least about 85% of the alumina content thereof, separating the residue resulting from said digesting with acid, reacting magnesia with said residue to form a magnesia containing silica composite, drying and calcining said composite.

2. A process as in claim 1 in which the amount of magnesia so reacted is such so as to provide from about 15 to about 35% of said magnesia containing silica catalyst.

3. A catalyst prepared in accordance with the process of claim 1.

4. A catalyst prepared in accordance with the process of claim 2.

5. A process for preparing a magnesia containing silica catalyst which comprises (1) digesting kaolin with acid so as to remove therefrom at least about 85% of the alumina content thereof, (2) separating the residue resulting from said digesting with acid, (3) reacting (a) said residue with (b) magnesia having a surface area of from about 10 to about 30 m.$^2$/g. in an amount sufficient to form a magnesia containing silica composite containing from about 15% to about 35% of said magnesia, (4) drying and calcining said composite.

6. A catalyst prepared in accordance with the process of claim 5.

References Cited by the Examiner
UNITED STATES PATENTS

| | | | |
|---|---|---|---|
| 2,611,738 | 9/52 | Webb et al. | 208—119 |
| 3,116,973 | 1/64 | Haden | 252—450 |

OTHER REFERENCES

"Catalyst for Petroleum Refining," Riesz et al., pages 279 to 322 in IV of Advances in Petroleum Chem. and Refining, 1961. Interscience Publishers Inc., New York.

DELBERT E. GANTZ, *Primary Examiner.*

ALPHONSO D. SULLIVAN, PAUL M. COUGHLAN, *Examiners.*